US011221400B2

(12) United States Patent
Webster et al.

(10) Patent No.: US 11,221,400 B2
(45) Date of Patent: Jan. 11, 2022

(54) DUAL MODE STACKED PHOTOMULTIPLIERS SUITABLE FOR USE IN LONG RANGE TIME OF FLIGHT APPLICATIONS

(71) Applicant: OmniVision Technologies, Inc., Santa Clara, CA (US)

(72) Inventors: Eric A. G. Webster, Mountain View, CA (US); Olivier Bulteel, Oslo (NO)

(73) Assignee: OMNIVISION TECHNOLOGIES, INC., Santa Clara, CA (US)

( * ) Notice: Subject to any disclaimer, the term of this patent is extended or adjusted under 35 U.S.C. 154(b) by 961 days.

(21) Appl. No.: 15/937,608

(22) Filed: Mar. 27, 2018

(65) Prior Publication Data

US 2019/0302240 A1 Oct. 3, 2019

(51) Int. Cl.
| | |
|---|---|
| G01S 7/48 | (2006.01) |
| G01S 7/4863 | (2020.01) |
| G01S 17/10 | (2020.01) |
| G01S 7/4861 | (2020.01) |
| G01S 17/894 | (2020.01) |

(52) U.S. Cl.
CPC .......... *G01S 7/4863* (2013.01); *G01S 7/4861* (2013.01); *G01S 17/10* (2013.01); *G01S 17/894* (2020.01)

(58) Field of Classification Search
USPC ........................................................ 356/5.01
See application file for complete search history.

(56) References Cited

U.S. PATENT DOCUMENTS

| | | | |
|---|---|---|---|
| 4,542,332 A | * | 9/1985 | van de Plassche ..... G05F 3/265 323/272 |
| 9,299,732 B2 | | 3/2016 | Webster et al. |
| 9,516,244 B2 | | 12/2016 | Borowski |
| 9,608,027 B2 | | 3/2017 | Sun et al. |

(Continued)

FOREIGN PATENT DOCUMENTS

| | | | | |
|---|---|---|---|---|
| EP | 2469301 A1 | * | 6/2012 | ............. G01S 17/90 |
| WO | WO-2012085149 A1 | * | 6/2012 | ........... G01S 7/4863 |

OTHER PUBLICATIONS

ROC (Taiwan) Patent Application No. 108110411—Taiwanese Office Action with English translation, dated Jan. 13, 2020, 14 pages.

(Continued)

*Primary Examiner* — James R Hulka
(74) *Attorney, Agent, or Firm* — Christensen O'Connor Johnson Kindness PLLC (57) ABSTRACT

A photomultiplier pixel cell includes a photon detector coupled to detect an incident photon. A quenching circuit is coupled to quench an avalanche current in the photon detector. An enable circuit is coupled to the photon detector to enable and disable the photon detector in response to an enable signal. A buffer circuit is coupled to the photon detector to generate a digital output signal having a pulse width interval in response to the avalanche current triggered in the photon detector. A first one of a plurality of inputs of a digital-to-analog converter is coupled to the buffer circuit to receive a digital output signal. The digital-to-analog converter is coupled to generate an analog output signal having a magnitude that is responsive to a total number of digital output signals received concurrently within the pulse width interval at each one of the plurality of inputs of the digital-to-analog converter.

18 Claims, 4 Drawing Sheets

(56) References Cited

U.S. PATENT DOCUMENTS

| | | | |
|---|---|---|---|
| 9,958,545 B2 | 5/2018 | Eichenholz et al. | |
| 9,997,551 B2 | 6/2018 | Mandai et al. | |
| 2012/0049897 A1* | 3/2012 | Kubo | H04L 25/0274 |
| | | | 327/108 |
| 2013/0300838 A1* | 11/2013 | Borowski | G01S 7/4865 |
| | | | 348/46 |
| 2015/0115131 A1* | 4/2015 | Webster | H04N 5/369 |
| | | | 250/208.1 |
| 2016/0240579 A1* | 8/2016 | Sun | G01S 17/894 |
| 2016/0284743 A1* | 9/2016 | Mellot | H01L 27/1443 |
| 2017/0179173 A1* | 6/2017 | Mandai | H01L 27/14643 |
| 2018/0026058 A1* | 1/2018 | Mellot | H01L 31/02164 |
| | | | 250/208.2 |
| 2018/0058924 A1* | 3/2018 | Storm | G01J 1/0228 |
| 2018/0088236 A1* | 3/2018 | Eichenholz | H01S 5/4012 |
| 2018/0090526 A1* | 3/2018 | Mandai | H01L 27/14616 |
| 2019/0324126 A1* | 10/2019 | Bulteel | G01S 7/4865 |

OTHER PUBLICATIONS

Bulteel et al., "Time of Flight Photosensor," U.S. Appl. No. 15/333,653, filed Oct. 25, 2016.

\* cited by examiner

DUAL MODE STACKED PHOTOMULTIPLIERS SUITABLE FOR USE IN LONG RANGE TIME OF FLIGHT APPLICATIONS

BACKGROUND INFORMATION

Field of the Disclosure

This disclosure relates generally to light sensors, and in particular but not exclusively, relates to photomultipliers that can be used in long range time of flight applications.

Background

Interest in three dimensional (3D) cameras is increasing as the popularity of 3D applications continues to grow in applications such as imaging, movies, games, computers, user interfaces, and the like. A typical passive way to create 3D images is to use multiple cameras to capture stereo or multiple images. Using the stereo images, objects in the images can be triangulated to create the 3D image. One disadvantage with this triangulation technique is that it is difficult to create 3D images using small devices because there must be a minimum separation distance between each camera in order to create the three dimensional images. In addition, this technique is complex and therefore requires significant computer processing power in order to create the 3D images in real time.

For applications that require the acquisition of 3D images in real time, active depth imaging systems based on the optical time of flight measurement are sometimes utilized. Time of flight systems typically employ a light source that directs light at an object, a sensor that detects the light that is reflected from the object, and a processing unit that calculates the distance to the object based on the round trip time that it takes for light to travel to and from an object. In typical time of flight sensors, photodiodes are often used because of the high transfer efficiency from the photo detection regions to the sensing nodes.

A continuing challenge with the acquisition of 3D images is that in long range applications, such as for example time of flight (TOF) light detection and ranging (LiDAR) applications, or the like, the large amounts of background light that exist outside during the mid-day make it more difficult to the detect reflected light pulses due to the large amount of ambient light. In particular, because so many photons arrive each second it is difficult to detect such a weak TOF signal on top of a very large background signal.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

Methods and apparatuses for sensing photons using dual mode stacked photomultipliers in a light sensing system suitable for use in long range time of flight systems are disclosed. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one example" or "one embodiment" means that a particular feature, structure, or characteristic described in connection with the example is included in at least one example of the present invention. Thus, the appearances of the phrases "in one example" or "in one embodiment" in various places throughout this specification are not necessarily all referring to the same example. Furthermore, the particular features, structures, or characteristics may be combined in any suitable manner in one or more examples.

Throughout this specification, several terms of art are used. These terms are to take on their ordinary meaning in the art from which they come, unless specifically defined herein or the context of their use would clearly suggest otherwise. It should be noted that element names and symbols may be used interchangeably through this document (e.g., Si vs. silicon); however, both have identical meaning.

As will be shown, examples of dual mode stacked photomultipliers that may be used to sense photons are disclosed. In various examples, arrays of photon detectors may be used to detect photons, even in bright ambient light conditions, which make the disclosed examples dual mode stacked photomultipliers suitable for use in long range time of flight applications such as LiDAR applications or the like in accordance with the teachings of the present invention. In the various examples, photomultiplier pixel cells, each including one or more photon detectors per pixel, such as for instance Geiger-mode Single Photon Avalanche Diodes (SPADs), are included in pixel arrays of the disclosed dual mode stacked photomultipliers. By having multiple photon detectors or SPADs per pixel, weak TOF signals may be detected, even in bright ambient light conditions where large numbers of photons from ambient light may also be incident upon the pixel array.

Furthermore, in various examples, each photon detector or SPAD can be individually or digitally enabled or disabled as needed in the event that it is determined that the particular SPAD suffers from poor high dark count rate (DCR) performance. As such, an entire photomultiplier pixel cell that includes a plurality of SPADs need not be disabled simply because one of the SPADs that are included in the photomultiplier pixel cell suffers from unacceptable DCR performance. Instead, only the poorly performing SPAD can be digitally disabled, while the remaining properly performing SPADs in the photomultiplier pixel cell may remain enabled to detect photons in accordance with the teachings of the present invention.

In addition, even though digital enable circuitry is featured in the disclosed photomultiplier pixel cells to individually enable and disable high DCR SPADs, analog circuitry is also combined in the disclosed examples photomultiplier pixel cells to provide high timing precision and edge detection, improve signal to noise ratio (SNR) performance, as well as reduce the overall transistor count compared to digital implementations. This combination of both digital and analog circuitry in the disclosed photomultiplier pixel cells results in the dual mode or digital-analog hybrid nature of the photomultiplier pixel cells in accordance with the teachings of the present invention. Moreover, in various embodiments, the photomultiplier pixel cells may also be implemented using stacking technology, which provides the additional benefit of no fill factor or light sensitivity penalty for the pixel circuitry included to support operation of the photomultiplier pixel cells in accordance with the teachings of the present invention.

Figure 1:
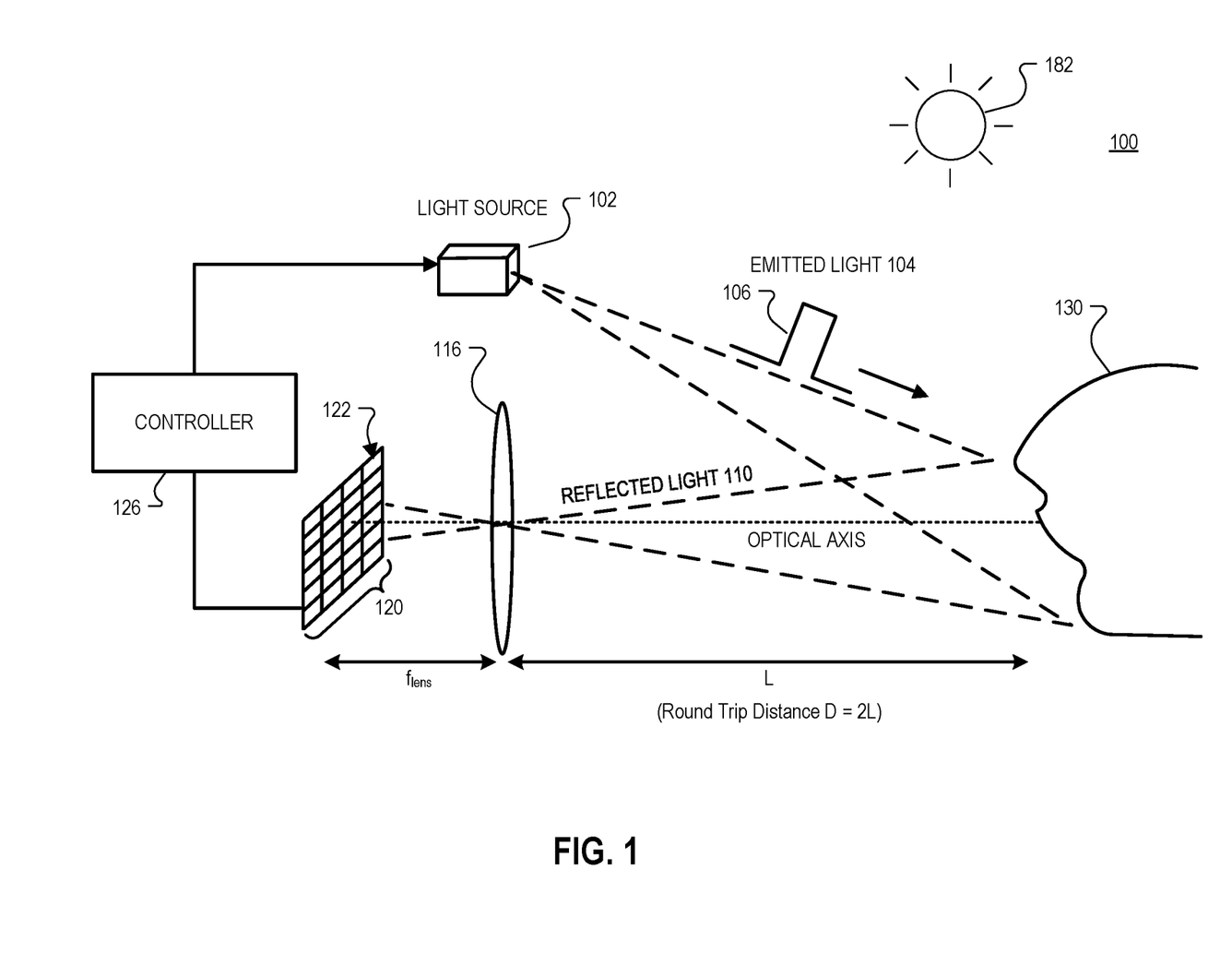
FIG. 1 is a block diagram that shows one example of a long range time of flight light sensing system including dual mode stacked photomultipliers in accordance with the teachings of the present invention.

FIG. 1 is a block diagram that shows one example of a long range time of flight light sensing system 100 including dual mode stacked photomultipliers in accordance with the teachings of the present invention. In particular, as shown in the depicted example, time of flight light sensing system 100 includes a light source 102, a lens 116, a pixel array 120 including a plurality of photomultiplier pixel cells 122, and a controller 126. Controller 126 is coupled to control operation of the light source 102 and the plurality of photomultiplier pixel cells 122 included in pixel array 120. In addition, controller 126 may also be coupled to process the information that is readout from pixel array 120.

As shown in the example, the pixel array 120 is positioned at a focal length $f_{lens}$ from lens 116. In the example, light source 102 and lens 116 are positioned at a distance L from object 130. It is appreciated that FIG. 1 is not illustrated to scale and that in one example the focal length $f_{lens}$ is substantially less than the distance L between lens 116 and object 130. Therefore, it is appreciated that for the purposes of this disclosure, the distance L and the distance L+focal length $f_{lens}$ are substantially equal for the purposes of time of flight measurements in accordance with the teachings of the present invention. As illustrated, pixel array 120 and controller 126 are represented as separate components for explanation purposes. However, it is appreciated that pixel array 120 and controller 126 may all be integrated onto a same stacked chip sensor. In other embodiments, pixel array 120 and controller 126 may be integrated onto a non-stacked standard planar sensor.

Furthermore, it is appreciated that the example pixel array 120 shown in FIG. 1 is illustrated as a two dimensional (2D) array of photomultiplier pixel cells 122 arranged into a plurality of rows and a plurality of columns. As such, it is appreciated that 2D pixel array 120 may be suitable for acquiring a 3D image of object 130. In another example (see, e.g., FIG. 4) it is appreciated that pixel array 120 may also be implemented as a one dimensional array of photomultiplier pixel cells 122, which can be useful in line scan sensor applications, or the like, in accordance with the teachings of the present invention. Furthermore, in yet another example, it is appreciated that if pixel array 120 may also be included in light sensing systems that do not require time of flight measurements, and in such systems, a light source 102 is not required.

However, referring back to the example depicted in FIG. 1, time of flight light sensing system 100 is a 3D camera that calculates image depth information of a scene to be imaged (e.g., object 130) based on time of flight measurements with pixel array 120. Time of flight light sensing system 100 may even operate in conditions with bright ambient light 182 (e.g., outside mid-day), and each photomultiplier pixel cell 122 in pixel array 120 can determine depth information for a corresponding portion of object 130 such that a 3D image of object 130 can be generated. Depth information is determined by measuring a round-trip time for light to propagate from light source 102 to object 130 and back to time of flight light sensing system 100.

As illustrated, light source 102 (e.g., a vertical-cavity surface-emitting laser) is configured to emit light 104, including light pulses 106, to object 130 over a distance L. Emitted light 104 is then reflected from object 130 as reflected light 110, some of which propagates towards time of flight light sensing system 100 over a distance L and is incident upon pixel array 120 as image light. Each photomultiplier pixel cell 122 in pixel array 120 includes one or more photon detectors (e.g., one or more SPADs) to detect the image light and convert the image light into an output signal.

As shown in the depicted example, the round-trip time for pulses (e.g., pulses 106) of the emitted light 104 to propagate from light source 102 to object 130 and back to plurality of pixels 120 can be used to determine the distance L using the following relationships in Equations (1) and (2) below:

$$T_{TOF} = \frac{2L}{c} \quad (1)$$

$$L = \frac{T_{TOF} \times c}{2} \quad (2)$$

where c is the speed of light, which is approximately equal to $3 \times 10^8$ m/s, and $T_{TOF}$ corresponds to the round-trip time which is the amount of time that it takes for pulses of the light 106 to travel to and from the object 130 as shown in FIG. 1. Accordingly, once the round-trip time is known, the distance L may be calculated and subsequently used to determine depth information of object 130.

As shown in the illustrated example, controller 126 is coupled to control pixel array 120 (including photomultiplier pixel cells 122 and light source 102, and includes logic that when executed causes time of flight light sensing system 100 to perform operations for determining the round-trip time. Determining the round-trip time may be based on, at least in part, timing signals generated by a time-to-digital converter (see, e.g., FIGS. 2-4). The timing signals are representative of when light source 102 emits light and when the photomultiplier pixel cells 122 detect the image light.

Figure 2:
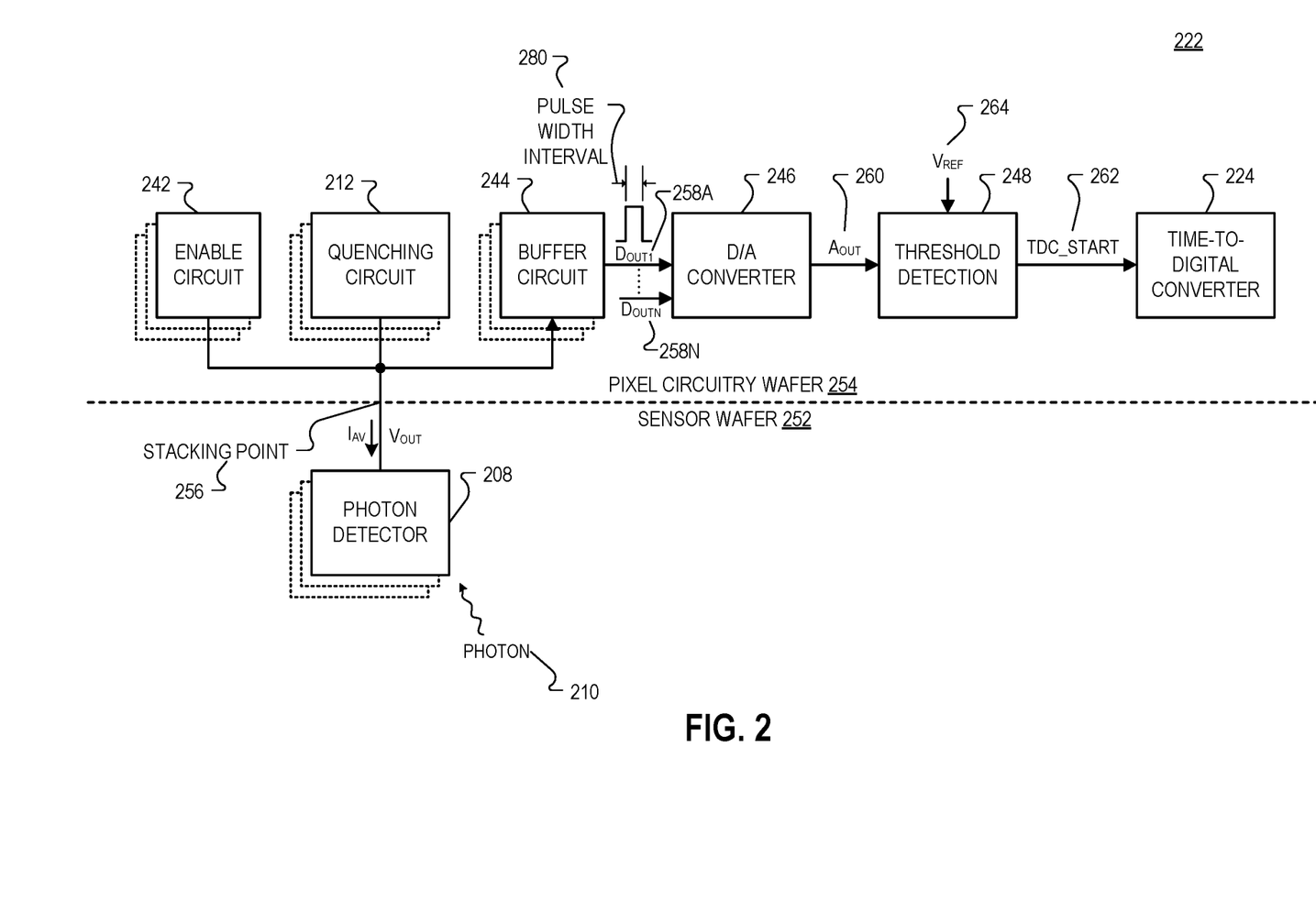
FIG. 2 is a functional block diagram that shows an example of a dual mode stacked photomultiplier pixel cell that may be included in the time of flight light sensing system of FIG. 1 in accordance with the teachings of the present invention.

FIG. 2 is a functional block diagram that shows an example of a dual mode stacked photomultiplier pixel cell 222 that may be included in the time of flight light sensing system 100 of FIG. 1 in accordance with the teachings of the present invention. It is appreciated that photomultiplier pixel cell 222 of FIG. 2 may be one example of one of the plurality of photomultiplier pixel cell 122 included for example in pixel array 120 of FIG. 1, and that similarly named and numbered elements referenced below are therefore coupled and function similar to as described above. As shown in the depicted example, photomultiplier pixel cell 222 of FIG. 2 includes a photon detector 208 coupled to detect an incident photon 210. In one example, photon detector 208 includes a silicon photomultiplier (SiPM), such as a Geiger-mode (GM) Single Photon Avalanche Photodiode (SPAD) such that the incident photon 210 is adapted to trigger an avalanche current $I_{AV}$ in the photon detector 208, causing a corresponding voltage spike in an output voltage signal $V_{OUT}$ in response to the photon detector 208 detecting the incident photon 210. A quenching circuit 212 is coupled to the photon detector 208 to quench the avalanche current $I_{AV}$, causing the output voltage signal $V_{OUT}$ to reset.

In the event it is determined that photon detector 208 is a defective, such as for example if photon detector has an unacceptably high dark count rate (DCR), an enable circuit 242 is coupled to the photon detector 208 to individually enable and disable the photon detector 208 in response to a digital enable signal. In the depicted example, it is appreciated that photon detector 208 (and corresponding support circuitry) may be one of a plurality of photon detectors (as indicated in FIG. 2 with dashed lines) included in photomultiplier pixel cell 222, and that other photon detectors in photomultiplier pixel cell 222 may be enabled while photon detector 208 is disabled in accordance with the teachings of the present invention.

Continuing with the example depicted in FIG. 2, buffer circuit 244 is coupled to the photon detector 208 to generate a digital output signal $D_{OUT1}$ 258A having a pulse width interval 280 in response to the avalanche current $I_{AV}$ or output voltage $V_{OUT}$ triggered in the photon detector 208. A digital-to-analog converter 246 having a plurality of inputs is coupled to the buffer circuit 244. As shown in the depicted example, buffer circuit 244 is a one of a plurality of buffer circuits, and a corresponding input of the digital-to-analog converter 246 is coupled to receive the digital output $D_{OUT1}$ 258A of buffer circuit 244. In operation, the digital-to-analog converter 246 is coupled to generate an analog output signal $A_{OUT}$ 260 having a magnitude that is responsive to a total number of digital output signals $D_{OUT1}$ 258A ... $D_{OUTN}$ 258N that are received concurrently within the pulse width interval 280 at each one of the plurality of inputs of the digital-to-analog converter in accordance with the teachings of the present invention.

As shown in the depicted example, a threshold detection circuit 248 includes a first input coupled to receive the analog output signal $A_{OUT}$ 260 from the digital-to-analog converter 246, and a second input coupled to receive a reference signal $V_{REF}$ 264. In one example, reference signal $V_{REF}$ 264 is a threshold voltage and threshold detection circuit 248 is coupled to compare the analog output signal $A_{OUT}$ 260 with the reference signal $V_{REF}$ 264 to generate a start signal TDC_START 262 in response to a comparison of the analog output signal $A_{OUT}$ 260 and the reference signal $V_{REF}$ 264. A time-to-digital converter circuit 224 is coupled to receive the start signal TDC_START 262 from threshold detection circuit 248. In one example, the time-to-digital converter circuit 224 is coupled to process time in response to a threshold number of digital output signals $D_{OUT1}$ 258A ... $D_{OUTN}$ 258N received concurrently within the pulse width interval 280 at the plurality of inputs of the digital-to-analog converter 246 in accordance with the teachings of the present invention. In one example, determining the round-trip time may be based on, at least in part, timing signals generated by time-to-digital converter circuit 224. The timing signals are representative of when light source 102 emits light and when the photon detector 208 detects the incident photon 210.

In one example, the photon detector 208 is disposed in a first wafer 252, such as a sensor wafer, and the other circuitry including the quenching circuit 212, the enable circuit 242, the buffer circuit 244, the digital-to-analog converter 246, the threshold detection circuit 248, and the time-to-digital converter circuit 224 are disposed in a separate second wafer 254, such as a pixel circuitry wafer, which is stacked with the first wafer 252 in a stacked chip scheme. In the illustrated example, the photon detector 208 in first wafer 252 is coupled to the quenching circuit 212 in the second wafer 254 through the stacking point 256 at the interface between the first wafer 252 and the second wafer 254. As such, it is appreciated that photomultiplier pixel cell 222 is implemented using stacking technology, which provides the additional benefit of no fill factor or light sensitivity penalty for the pixel circuitry included to support operation of the photomultiplier pixel cell 222 in accordance with the teachings of the present invention.

Figure 3:
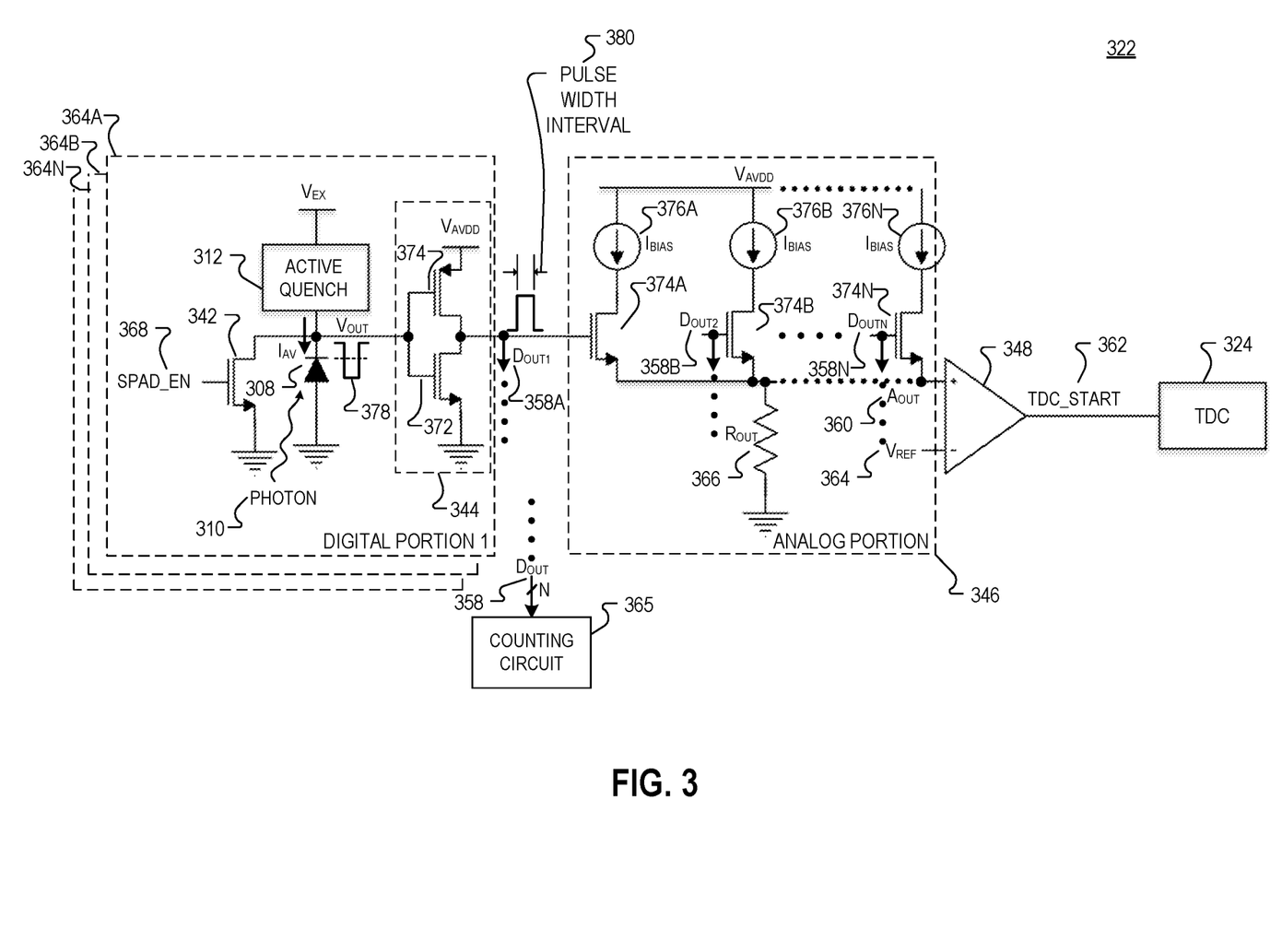
FIG. 3 is a schematic diagram that shows an example of a dual mode stacked photomultiplier pixel cell including both digital and analog portions that may be included in the time of flight light sensing system of FIG. 1 in accordance with the teachings of the present invention.

FIG. 3 is a schematic diagram that shows an example of a dual mode stacked photomultiplier pixel cell 322 including both digital and analog portions that may be included in the time of flight light sensing system 100 of FIG. 1 in accordance with the teachings of the present invention. It is appreciated that photomultiplier pixel cell 322 of FIG. 3 may be one example of one of the plurality of photomultiplier pixel cell 122 included for example in pixel array 120 of FIG. 1 or photomultiplier pixel cell 222 of FIG. 2, and that similarly named and numbered elements referenced below are therefore coupled and function similar to as described above.

Similar to the example photomultiplier pixel cell 222 of FIG. 2, photomultiplier pixel cell 322 of FIG. 3 includes a photon detector 308 coupled to detect an incident photon 310. In the depicted example, photon detector 308 is a silicon photomultiplier (SiPM) implemented using a Geiger-mode (GM) Single Photon Avalanche Photodiode (SPAD) such that the incident photon 310 is adapted to trigger an avalanche current $I_{AV}$ in the photon detector 308, causing a corresponding downward voltage transition in an output voltage signal $V_{OUT}$ 378 in response to the photon detector 308 detecting the incident photon 310. A quenching circuit 312 is coupled between an excess voltage $V_{EX}$ and the photon detector 308 to control the quenching the avalanche current $I_{AV}$, causing the output voltage signal $V_{OUT}$ 378 to recover as shown.

In the example, the SPAD of photon detector 308 is reversed biased according to Equation (3):

$$V_{EX} = V_{BIAS} - V_{BD} \qquad (3)$$

where $V_{BIAS}$ is the reverse bias of the SPAD, $V_{BD}$ is the breakdown voltage of the SPAD. In the example, $V_{BIAS} > V_{BD}$, such that $V_{EX}$ is the excess bias beyond the breakdown voltage of the SPAD.

As will be discussed, in the depicted example, quenching circuit 312 is an active quenching circuit that controls the recovery of the SPAD such that the output voltage signal $V_{OUT}$ 378 rises back above a threshold voltage (e.g., as shown with a horizontal dashed line relative to output voltage signal $V_{OUT}$ 378) after a specific time interval after the downward voltage transition caused by the avalanche current $I_{Av}$ in photon detector 308, which results in each buffer circuit 344 generating a constant or fixed pulse width interval 380 in the digital output signal $D_{OUT}$ 358 in accordance with the teachings of the present invention. In another example, it is appreciated that the buffer circuits 344 may be integrated into the design of the respective quench circuit 312.

In the event it is determined that photon detector 308 is identified as defective, such as for example if the SPAD of photon detector has an unacceptably high dark count rate (DCR), an enable circuit 342 is coupled to the photon detector 308 to individually enable and disable the photon detector 308 in response to a digital enable signal SPAD_EN 368. In the depicted example, it is appreciated that photon detector 308 may be one of a plurality of photon detectors included in photomultiplier pixel cell 322, and that other photon detectors in photomultiplier pixel cell 322 may remain enabled while photon detector 308 is disabled in accordance with the teachings of the present invention. In one example, the enable circuit 342 comprises a transistor coupled between a voltage reference terminal and the SPAD of photon detector 308. For instance, in the example depicted in FIG. 3, the enable circuit 342 comprises a transistor coupled between a ground terminal and a cathode of the SPAD of photon detector 308. In another example, it is appreciated of course that the polarities may be reversed if the p-n junction polarity of the SPAD is swapped. In operation, when the transistor of enable circuit 342 is switched on in response to the digital enable signal SPAD_EN 368, cathode of the SPAD of photon detector 308 is tied to ground to individually disable the SPAD of photon detector 308.

In one example, the SPAD of photon detector 308 may be identified as defective by performing a dark frame calibration where all SPADs in the array are addressed individually sequentially using the enable signal SPAD_EN 368 and the output count rate measured at $D_{OUT}$ 358 (shared by all pixels in the array) with counting circuit 365. For instance, in one example, the SPADs of photon detectors 308 with a high DCR (e.g., in the top 5%) may then be disabled via the enable signal SPAD_EN 368. In one example, $D_{OUT}$ 358 can be configured as an N-bit output to common bus. The N bits of $D_{OUT}$ 358 can then also be used in a parallel operation mode (e.g., at chip start up) to sweep through all the available SPADs of photon detectors 308, and then, via the coupling to counting circuit 365, be used to measure the DCR of each of the SPADs in photon detectors 308, and thus determine which of the SPADs are low noise and which are high noise SPADs.

Continuing with the example depicted in FIG. 3, the buffer circuit 344 of digital portion 364A is coupled to the photon detector 308 to generate the digital output signal $D_{OUT1}$ 358A having a pulse width interval 380 in response to the avalanche current $I_{AV}$ or output voltage $V_{OUT}$ 378 triggered in the photon detector 308. In the illustrated example, the buffer circuit 344 is an inverter implemented with p-transistor 374 coupled to n-transistor 372 as shown to generate the digital output signal $D_{OUT1}$ 358A in response to the output voltage $V_{OUT}$ 378 generated by the photon detector 310 in response to the avalanche current $I_{AV}$ triggered in the photon detector 308 in response to the incident photon 310. It is appreciated that the inverter of buffer circuit 344 isolates the photon detector 308 from the digital-to-analog converter and later stages included in the analog portion 346 of photomultiplier pixel cell 322, including all of the parasitic capacitance present at the analog output voltage $A_{OUT}$ 360 that would otherwise degrade SPAD device performance.

In particular, as shown in the depicted example, the photon detector 308, the quenching circuit 312, the enable circuit 342, and the buffer circuit 344 are included in the first digital portion 364A of the photomultiplier pixel cell 322, while a digital-to-analog converter is included in an analog portion 346 of the photo multiplier pixel cell 322. As shown, the first digital portion 364A is one of a plurality of digital portions 364A, 364B, . . . 364N, which are coupled to the analog portion 346 and counting circuit 365 as discussed above.

The digital-to-analog converter included in analog portion 346 has a plurality of inputs, each of which is coupled to a corresponding buffer circuit 344 from the digital portions 364A, 364B, . . . 364N. As shown in the depicted example, each corresponding input of the digital-to-analog converter included in analog portion 346 is coupled to receive a corresponding bit of digital output $D_{OUT1}$ 358A . . . $D_{OUTN}$ 358N from the buffer circuits 344 of the digital portions 364A, 364B, . . . 364N. In operation, the digital-to-analog converter in analog portion 346 is coupled to generate an analog output signal $A_{OUT}$ 360 having a magnitude that is responsive to a total number of digital output signals $D_{OUT1}$ 358A . . . $D_{OUTN}$ 358N that are received concurrently within the pulse width interval 380 at each one of the plurality of inputs of the digital-to-analog converter in the analog portion 346 in accordance with the teachings of the present invention.

In the illustrated example, the digital-to-analog converter in the analog portion includes a plurality of switched current sources 376A, 376B, . . . 376N that are coupled in parallel. Each one of the plurality of switched current sources 376A, 376B, . . . 376N is switched with a corresponding transistor 374A, 374B, . . . 374N, which are coupled to be switched in response to a corresponding digital output signals $D_{OUT}$ 358A . . . $D_{OUTN}$ 358N, which are received from a corresponding digital portion 364A, 364B, . . . 364N of the photomultiplier pixel cell 322.

As shown, an output resistor $R_{OUT}$ 366 is coupled to the plurality of switched current sources 376A, 376B, . . . 376BN such that a total sum of the currents from the plurality of switched current sources 376A, 376B, . . . 376N is conducted through the output resistor $R_{OUT}$ 366 within the pulse width interval 380 to generate the analog output signal $A_{OUT}$ 360 across the output resistor $R_{OUT}$ 366 in accordance with the teachings of the present invention. Therefore, the value of the analog output signal $A_{OUT}$ 360 across the output resistor $R_{OUT}$ 366 can be determined using the following relationship defined in Equation (4):

$$A_{OUT} = N_{SPAD} \times I_{BIAS} \times R_{OUT} \qquad (4)$$

where $N_{SPAD}$ represents the number of photon detectors 308 that have detected an incident photon 310 within the pulse width interval 380, $I_{BIAS}$ represents the current value of each switched current source 376A, 376B, . . . 376N that have been switched on in response to digital output signals $D_{OUT1}$ 358A . . . $D_{OUTN}$ 358N, and $R_{OUT}$ represents the resistance value of $R_{OUT}$ 366. Thus, since $I_{BIAS}$ and $R_{OUT}$ are fixed, the magnitude of $A_{OUT}$ is proportional to the number of SPADs that are triggered in response to incident photons 310 within the pulse width interval 380 in accordance with the teachings of the present invention.

As shown in the depicted example, a threshold detection circuit 348 is implemented with a comparator circuit that includes a first input (e.g., the non-inverting input) coupled to receive the analog output signal $A_{OUT}$ 360 from the digital-to-analog converter of the analog portion 346, and a second input (e.g., the inverting input) coupled to receive a reference signal $V_{REF}$ 364. In the example, reference signal $V_{REF}$ 364 is a threshold voltage, and threshold detection circuit 348 is coupled to compare the analog output signal $A_{OUT}$ 360 with the reference signal $V_{REF}$ 364 to generate a start signal TDC_START 362 in response to a comparison of the analog output signal $A_{OUT}$ 360 and the reference signal $V_{REF}$ 364.

A time-to-digital converter circuit 324 is coupled to receive the start signal TDC_START 362 from threshold detection circuit 348. In one example, the time-to-digital converter circuit 324 is coupled to process time in response to a threshold number of digital output signals $D_{OUT1}$ 358A . . . $D_{OUTN}$ 358N received concurrently within the pulse width interval 380 at the plurality of inputs of the digital-to-analog converter of analog portion 346 in accordance with the teachings of the present invention. In other words, by selecting a threshold voltage for reference signal $V_{REF}$ 364 that corresponds to a threshold of detection, the time-to-digital converter circuit 324 can be adapted to only process time when the required number of SPADs in photon detectors 308 have been triggered during the pulse width interval 380. As such, the threshold voltage for reference signal $V_{REF}$ 364 can be set such that the threshold detection circuit 348 triggers when there is a large pulse of light over a high background light count rate. In one example, determining the round-trip time may be based on, at least in part, timing signals generated by time-to-digital converter circuit 324. The timing signals are representative of when light source 102 emits light and when the photon detector 308 detects the incident photon 310.

In operation, it is noted that for time of flight calculations, there may be two different ways of operating the system. For instance, the time-to-digital converter circuit 324 can be configured by the system either (1) to start at the beginning of the frame when the light is sent out, and then stop when the signal is received; or (2) to start when light is received, and then stop by the end of the frame (i.e., maximum detection range reached). Using the second approach has the advantage that power consumption is reduced since the time-to-digital converter circuit 324 is not running for the whole time of flight even if the SPAD pixel is not triggered by signal photons.

Figure 4:
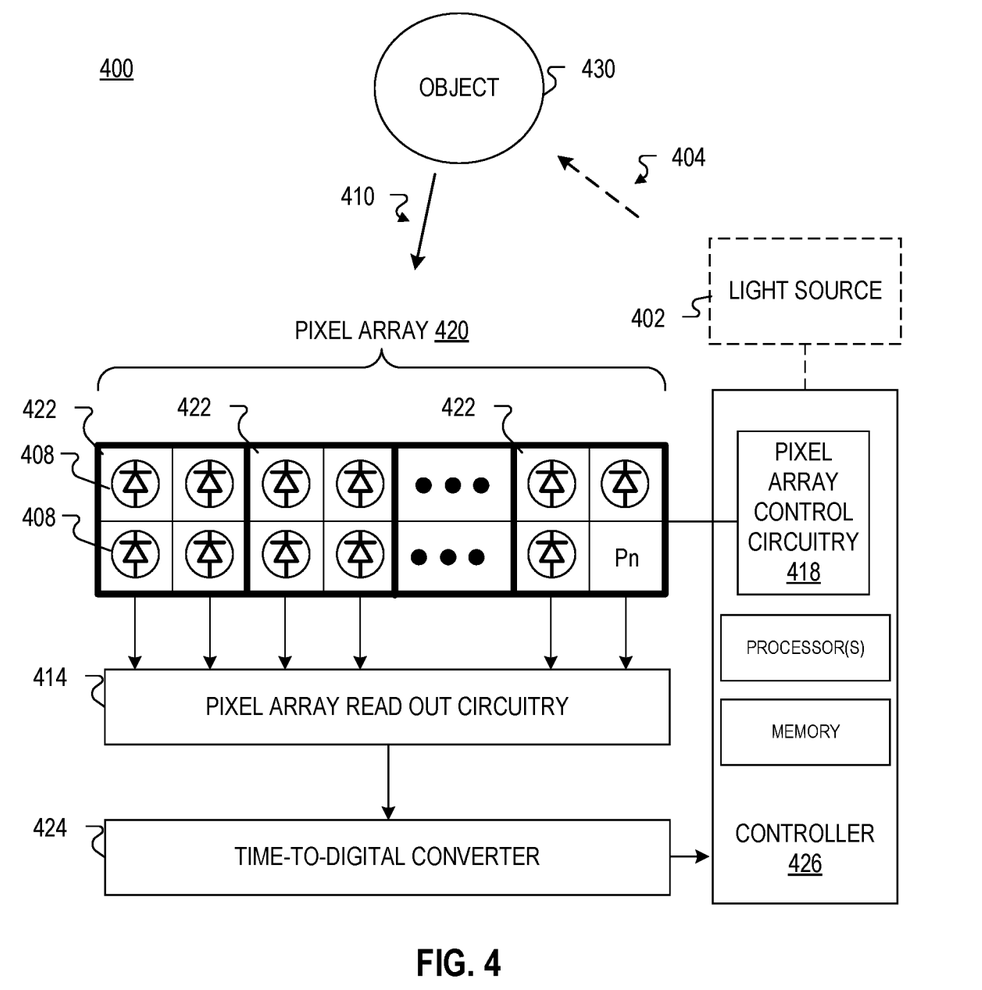
FIG. 4 is a block diagram that shows another example of light sensing system that may be used in a long range time of flight system including dual mode stacked photomultiplier pixel cells in accordance with the teachings of the present disclosure.

FIG. 4 is a block diagram that shows another example of light sensing system 400 that may be used in a long range time of flight system including dual mode stacked photomultipliers in accordance with the teachings of the present disclosure. As shown in the depicted example, light sensing system 400 includes a pixel array 420 including a plurality of photomultiplier pixel cells 422 with corresponding photon detectors 408. It is appreciated that photomultiplier pixel cells 422 and photon detectors 408 of FIG. 4 may be examples of photomultiplier pixel cell 322 and photon detector 308 of FIG. 3, or photomultiplier pixel cell 222 and photon detector 208 of FIG. 2, or photomultiplier pixel cells 122 included in pixel array 120 of FIG. 1, and that similarly named and numbered elements referenced below are therefore coupled and function similar to as described above.

It is noted that in the example depicted in FIG. 4, each photomultiplier pixel cell 422 includes a plurality of photon detectors 408, and that the pixel array 420 example illustrated in FIG. 4 is a one dimensional array of photomultiplier pixel cell 422. As such, the example pixel array 420 depicted in FIG. 4 is illustrative of a line scan sensor. However, it is appreciated that in other examples, pixel array 420 may also be implemented as a two dimensional array to capture two dimensional images.

It is further noted that the example depicted in FIG. 4, includes a light source 402 such that time of flight information can be determined based on the round trip time for light 404 emitted from light source 402 to be reflected back from object 430 to pixel array 420 as discussed in detail above. It is appreciated that in another example, light source 402 may be omitted in applications where pixel array 420 is included to detect photons, such as positron emission tomography (PET) scan applications, or the like, and time of flight information is not needed.

Referring back to the illustrated example, light sensing system 400 also includes pixel array read out circuitry 414, time-to-digital converter 424, and controller 426, which includes pixel array control circuitry 418 to control operation of pixel array 420. As discussed, in one example, controller 426 may be coupled to a light source 402 to emit light 404 to an object 430, which reflects light 420 back to pixel array 420 for long range time of flight applications. In one example, controller 426 may include processors, memory, and various other functional logic to process the information read out from pixel array 420 in accordance with the teachings of the present disclosure. It is noted that light sensing system 400 may be implemented in a stacked chip scheme. As mentioned in previous examples, pixel array 420 may be included in a sensor wafer, while pixel array read out circuitry 414, time-to-digital converter 424, controller (logic that may include one or more processor and memory) 426 including pixel array control circuitry 418, as illustrated in FIG. 4, may be included in a separate pixel circuitry wafer. In one example, the pixel circuitry wafer may be implemented as an application specific integrated circuit (ASIC) die in accordance with the teachings of the present invention. In the example, the sensor wafer and the pixel circuitry wafer are stacked and coupled together during fabrication to implement a time of flight light sensing system in accordance with the teachings of the present invention. In other embodiments, a non-stacked implementation of light sensing system 400 may be utilized. For example, the sensor wafer (including pixel array 420), pixel array readout circuitry 414, time-to-digital converter 424, and controller 426, including control circuitry 418, may be fabricated on the same silicon substrate. In general, it is appreciated that light sensing system 400 may be implemented in both stacked and non-stack solutions in accordance with the teachings of the present invention.

The above description of illustrated examples of the invention, including what is described in the Abstract, is not intended to be exhaustive or to limit the invention to the precise forms disclosed. While specific examples of the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific examples disclosed in the specification. Rather, the scope of the invention is to be determined entirely by the following claims, which are to be construed in accordance with established doctrines of claim interpretation.

What is claimed is:

1. A photomultiplier pixel cell, comprising:
a photon detector coupled to detect an incident photon, wherein the incident photon is adapted to trigger an avalanche current in the photon detector;
a quenching circuit coupled to the photon detector to quench the avalanche current;
an enable circuit coupled to the photon detector to enable and disable the photon detector in response to an enable signal;
a buffer circuit coupled to the photon detector to generate a digital output signal having a pulse width interval in response to the avalanche current triggered in the photon detector; and
a digital-to-analog converter having a plurality of inputs, wherein the buffer circuit is a first one of a plurality of buffer circuits, wherein a first one of the inputs of the digital-to-analog converter is coupled to the first one of the plurality of buffer circuits to receive a respective one of a plurality of digital output signals, wherein the digital-to-analog converter is coupled to generate an analog output signal having a magnitude that is responsive to a total number of digital output signals received concurrently within the pulse width interval at each one of the plurality of inputs of the digital-to-analog converter,
wherein the buffer circuit comprises an inverter coupled to generate the digital output signal in response to an output voltage generated by the photon detector in response to the avalanche current triggered in the photon detector in response to the incident photon, wherein the inverter isolates the photon detector from the digital-to-analog converter.

2. The photomultiplier pixel cell of claim 1, further comprising:
a threshold detection circuit having a first input coupled to receive the analog output signal from the digital-to-analog converter, and a second input coupled to receive a reference signal, wherein the threshold detection circuit is coupled to generate a start signal in response to the analog signal and the reference signal; and
a time-to-digital converter circuit coupled to receive the start signal, wherein the time-to-digital converter circuit is coupled to process time in response to a threshold number of digital output signals received concurrently within the pulse width interval at the plurality of inputs of the digital-to-analog converter.

3. The photomultiplier pixel cell of claim 2, wherein the photon detector is disposed in a first wafer, and wherein the quenching circuit, the enable circuit, the buffer circuit, the digital-to-analog converter, the threshold detection circuit, and the time-to-digital converter circuit are disposed in a second wafer that is stacked with the first wafer in a stacked chip scheme.

4. The photomultiplier pixel cell of claim 1, wherein the photon detector comprises a Geiger-mode Single Photon Avalanche Photodiode (SPAD).

5. The photomultiplier pixel cell of claim 4, wherein the enable circuit comprises a transistor coupled between a voltage reference terminal and the SPAD, wherein the transistor is coupled to be switched in response to the enable signal to individually enable and disable the SPAD.

6. The photomultiplier pixel cell of claim 1, wherein the quenching circuit comprises an active quenching circuit coupled to generate a constant width for the pulse width interval of the digital output signal.

7. The photomultiplier pixel cell of claim 1, wherein the photon detector, the quenching circuit, the enable circuit, and the buffer circuit are included in a digital portion of the photomultiplier pixel cell, wherein the digital-to-analog converter is included in an analog portion of the photo multiplier pixel cell, wherein digital portion is one of a plurality of digital portions, and wherein the photo multiplier pixel cell includes the plurality of digital portions coupled to the analog portion.

8. The photomultiplier pixel cell of claim 1, wherein the digital-to-analog converter comprises:
a plurality of switched current sources coupled in parallel, wherein each one of the plurality of switched current sources is switched in response to a respective digital output signal of a corresponding one of the plurality of buffer circuits; and
an output resistor coupled to the plurality of switched current sources, wherein a total sum currents from the plurality of switched current sources is conducted through the output resistor within the pulse width interval to generate the analog output signal across the output resistor.

9. A light sensing system, comprising:
a pixel array including a plurality of photomultiplier pixel cells, wherein each pixel cell comprises:
a photon detector coupled to detect an incident photon, wherein the incident photon is adapted to trigger an avalanche current in the photon detector;
a quenching circuit coupled to the photon detector to quench the avalanche current;
an enable circuit coupled to the photon detector to enable and disable the photon detector in response to an enable signal;
a buffer circuit coupled to the photon detector to generate a digital output signal having a pulse width interval in response to the avalanche current triggered in the photon detector; and
a digital-to-analog converter having a plurality of inputs, wherein the buffer circuit is a first one of a plurality of buffer circuits, wherein a first one of the inputs of the digital-to-analog converter is coupled to the first one of the plurality of buffer circuits to receive a respective one of a plurality of digital output signals, wherein the digital-to-analog converter is coupled to generate an analog output signal having a magnitude that is responsive to a total number of digital output signals received concurrently within the pulse width interval at each one of the plurality of inputs of the digital-to-analog converter,
wherein the buffer circuit comprises an inverter coupled to generate the digital output signal in response to an output voltage generated by the photon detector in response to the avalanche current triggered in the photon detector in response to the incident photon, wherein the inverter isolates the photon detector from the digital-to-analog converter; and
a controller coupled to the pixel array to control operation of the plurality of photomultiplier pixel cells, wherein the controller is further coupled to process the analog output signal.

10. The light sensing system of claim 9, wherein the light sensing system is included in a line scan sensor.

11. The light sensing system of claim 9, further comprising a light source coupled to the controller, wherein the light source is coupled to emit light towards an object such that the emitted light is reflected from the object to the pixel array to determine a distance to the object from the pixel array based on a time-of-flight of the light from the light source.

12. The light sensing system of claim 9, wherein each pixel cell further comprises:
a threshold detection circuit having a first input coupled to receive the analog output signal from the digital-to-analog converter, and a second input coupled to receive a reference signal, wherein the threshold detection circuit is coupled to generate a start signal in response to the analog signal and the reference signal; and
a time-to-digital converter circuit coupled to receive the start signal, wherein the time-to-digital converter circuit is coupled to process time in response to a threshold number of digital output signals received concurrently within the pulse width interval at the plurality of inputs of the digital-to-analog converter.

13. The light sensing system of claim 12, wherein the photon detector is disposed in a first wafer, and wherein the quenching circuit, the enable circuit, the buffer circuit, the digital-to-analog converter, the threshold detection circuit, and the time-to-digital converter circuit are disposed in a second wafer that is stacked with the first wafer in a stacked chip scheme.

14. The light sensing system of claim 9, wherein the photon detector comprises a Geiger-mode Single Photon Avalanche Photodiode (SPAD).

15. The light sensing system of claim 14, wherein the enable circuit comprises a transistor coupled between a voltage reference terminal and the SPAD, wherein the transistor is coupled to be switched in response to the enable signal to individually enable and disable the SPAD.

16. The light sensing system of claim 9, wherein the quenching circuit comprises an active quenching circuit coupled to generate a constant width for the pulse width interval of the digital output signal.

17. The light sensing system of claim 9, wherein the photon detector, the quenching circuit, the enable circuit, and the buffer circuit are included in a digital portion of each pixel cell, wherein the digital-to-analog converter is included in an analog portion of each pixel cell, wherein digital portion is one of a plurality of digital portions, and wherein each pixel cell includes the plurality of digital portions coupled to the analog portion.

18. The light sensing system of claim 9, wherein the digital-to-analog converter comprises:
a plurality of switched current sources coupled in parallel, wherein each one of the plurality of switched current sources is switched in response to a respective digital output signal of a corresponding one of the plurality of buffer circuits; and
an output resistor coupled to the plurality of switched current sources, wherein a total sum currents from the plurality of switched current sources is conducted through the output resistor within the pulse width interval to generate the analog output signal across the output resistor.

* * * * *